(12) United States Patent
Lee

(10) Patent No.: US 6,201,496 B1
(45) Date of Patent: Mar. 13, 2001

(54) TARGET ANGLE ESTIMATOR FOR SEARCH RADARS

(75) Inventor: Henry E. Lee, Columbia, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 06/224,410

(22) Filed: Jan. 12, 1981

(51) Int. Cl.[7] ............................................. G01S 13/72
(52) U.S. Cl. ........................ 342/90; 342/62; 342/93; 342/97; 342/99; 342/133; 342/139; 342/140; 342/146; 342/158
(58) Field of Search ........................ 343/16 R; 342/62, 342/74, 75, 77, 81, 83–85, 90, 92, 93, 95, 97, 99–101, 133, 135, 139–141, 146, 147, 153, 154, 157–159, 162, 174

(56) References Cited

U.S. PATENT DOCUMENTS

| | | | |
|---|---|---|---|
| 3,077,595 | * | 2/1963 | Frost ..................................... 342/144 |
| 3,359,442 | * | 12/1967 | Grogonsky ........................... 342/147 |
| 3,579,237 | * | 5/1971 | Steingart et al. ..................... 342/147 |
| 3,701,989 | * | 10/1972 | Calhoun, Sr. et al. ................ 342/94 |
| 3,710,384 | * | 1/1973 | Ashcraft ................................. 342/94 |
| 3,735,403 | * | 5/1973 | Sykes .................................... 342/158 |
| 3,768,097 | * | 10/1973 | Ziegler ................................. 342/136 |
| 6,114,984 | * | 9/2000 | McNiff ................................... 342/62 |

* cited by examiner

Primary Examiner—John B. Sotomayor

(57) ABSTRACT

A search radar including the improvement of apparatus for enhancing the estimation of the target angle within a search scan of the radar is disclosed. More specifically, the improvement apparatus utilizes the generated scan angles and target amplitude measurements correspondingly associated therewith to generate intermediate signals which are representative of the natural logarithm of the target amplitude measurements plus the square of the corresponding scan angle multiplied by a predetermined constant. For each search scan, the apparatus computes separately signals representative of the moments of: the scan angles, the squares of the scan angles, the products of the scan angles and corresponding intermediate signals, and the intermediate signals. In turn, the apparatus operates on the computed moment representative signals in some prespecified mathematical relationship to effect an optimum estimation for the target angle in each search scan of the radar. Simulated test results of the operation of the disclosed apparatus indicate an improvement over the simple centroid method of target angle estimation especially under the adverse conditions of a scintillating target with Rayleigh amplitude distribution.

7 Claims, 4 Drawing Sheets

US 6,201,496 B1

TARGET ANGLE ESTIMATOR FOR SEARCH RADARS

BACKGROUND OF THE INVENTION

The present invention relates to single-channel search radars, in general, and more particularly, to apparatus for use therein which improves the estimation of the angle of a detected target within the search scan of the radar.

Most modern aircraft having weapon delivery systems generally employ a search radar for detecting targets of interest. In searching for a target, these radars usually scan through a spatial area with a plurality of looks or beam search samples. At each look, the radar may derive the amplitude of signals reflected from the target within the spatial area. Thereafter, the search radar may compute an estimated target scan angle from the amplitudes derived through the search scan. In turn, this estimated angle may be used to provide direction to the weapon delivery system for deployment of projectiles toward the target, for example.

An illustration of a typical scenario with regard to detecting a target is depicted in FIG. 1. Suppose that the aircraft, denoted at 10, is flying along a flight path 12 in the direction indicated by the solid arrow 14. At a flight position P1, the search radar on-board the aircraft 10 may scan a spatial area 16 with its radar beam 18 in search of a target depicted in the figure as the dot 20. In its search, the beam 18 of the radar may be scanned through a plurality of looks L1, L2, ..., L9 corresponding to a plurality of scan angles θ1, θ2, ..., θ9. At each look L1, the search radar may correspondingly derive an amplitude ai of the radar signal reflected from the target 20. An idealistic example of a plot of amplitudes $a_i$ for the present example may appear as that shown by the x's on the dashed line in the graph of FIG. 2.

Referring to FIG. 2, in some search radars, a simple centroiding procedure having the formula $\Sigma a_i a_i / \Sigma a_i$, for example, has been used to compute the estimated target angle $\theta_t$ which, of course, falls between the scan angles θ5 and θ6 for the aircraft position P1 in the present example. Accordingly, as the aircraft 10 moves to another position P2, another scan of looks may be performed and corresponding amplitudes computed by the search radar. Similarly, a curve of amplitudes for the search scan at position P2 may be compiled as that shown by the second dashed line (P2) curve in FIG. 2. It follows that the computed centroid of this second curve (P2) will be the estimated target angle with respect to the new aircraft position P2.

While for an ideal case, this simple centroiding procedure appears adequate for accurately estimating the true target angle for weapon delivery, it is evident that in more practical cases, the accuracy of the target angle estimation with this method may be somewhat degraded. For example, under most conditions, the aircraft search radar incurs undesirable noise at the input stages of the search radar itself. It happens that this instrumentation noise is inseparable from the echo signals returned from the target and thus tends to effect relatively large errors in the computation of the amplitude measurements of the target reflections through the various search beam directions. To further complicate matters, there is no guarantee that the beam scanning samples or looks will be scanned symmetrically about the true target angle. Moreover, even greater inaccuracies with the centroidal method can be expected when target scintillation provides further adverse noise sources.

Apparently, in view of the practical problems of noise as discussed above, the actual amplitude measurements derived by the search radar are not expected to follow any ideal curve fitting pattern for most practical sets of conditions. For example, the graph of FIG. 3 illustrates a case in which actual amplitude measurements $r(\theta_i)$, denoted by X's, do not coincide with the ideal 1 amplitude measurements $s(\theta_i)$ denoted by the dots lying substantially on the dashed line curve. In this case, it is quite apparent that the simple centroid of the actual amplitude measurements will not result in an accurate estimation of the true target scan angle. Consequently, if the calculated simple centroid was used as the true target angle, it would cause an erroneous deployment angle for the weapon delivery system of the aircraft, for example.

From the above, it is evident that to be a viable piece of equipment for enhancing the effectiveness of weapon deployment, as one example, the search radar of the aircraft must accurately estimate the true scan angle of the target under even the most adverse conditions of noise with regard to both the aircraft and target flights and the internal operations of the radar itself. To accomplish this, it is felt that more sophisticated apparatus beyond that of a simple centroiding method is needed to process the actual amplitude measurements as derived by the search radar.

SUMMARY OF THE INVENTION

A search radar, which includes means operative to transmit and receive radar signals for a plurality of predetermined scan angles within a search scan; means operative to generate a plurality of signals representative of the predetermined scan angles; and means operative to generate a plurality of target amplitude measurement signals derived from the received radar signals respectively corresponding to the plurality of predetermined scan angles, is improved by the addition of apparatus for estimating the target angle within a search scan.

More specifically, the apparatus comprises a first means operative to compute an intermediate signal for each prespecified angle of the plurality in accordance with a first function based on the generated angle signal and the generated target amplitude measurement signal correspondingly associated therewith; second means operative to compute signals representative of moment relationships of the corresponding plurality of prespecified scan angle signals and intermediate signals for a search scan of the radar; and third means operative to compute a signal representative of the estimated target angle for a search scan in accordance with a second function based on the correspondingly associated moment-related signals of the search scan computed by the second means. In the search scan of the present embodiment, means are provided for detecting the presence of a target within the search scan of the radar from the drive amplitude measurement signals thereof and for generating a target detect signal as a result of the detected condition. In this embodiment, the improvement apparatus includes means operative in response to the generated target detect signal to compute the estimated target angles corresponding to the search scans.

In accordance with one aspect of the invention, the first means includes means for computing first signals representative of the logarithm of the derived target amplitude measurement signals; means for computing second signals proportionately representative of the square of the generated scan angle signals; and means for adding corresponding first and second signals to compute the intermediate signals associated therewith. Further, the second means includes means for accumulating separately the first signals, the second signals, the signals representative of the scan angles, and the intermediate signals over the period of a search scan. Still further, the third means includes means for generating first, second, third and fourth product signals representative of the products of: the third signal and moment signal of the second signals, the moment signal of the scan angle signals and the moment signal of the intermediate signals, the moment signal of the first signals and the third signal, and the moment signal of the scan angle signals with itself, respectively; means for generating fourth and fifth signals by subtracting the second product signal from the first product signal and by subtracting the fourth product signal from the third product signal, respectively; and means for generating the signal representative of the estimated target angle for a search scan by dividing the fourth signal by the fifth signal.

DESCRIPTION OF THE PREFERRED EMBODIMENT

Figure 1:
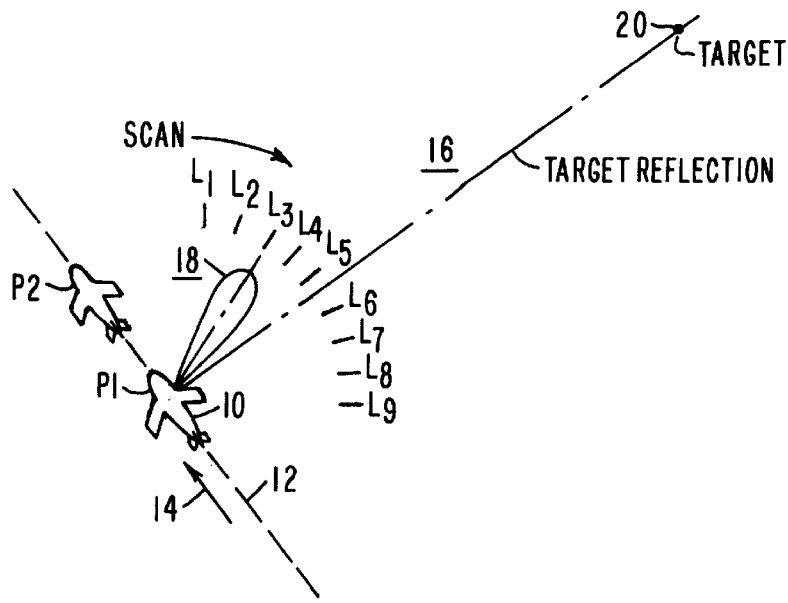
FIG. 1 is an illustration of a typical scenario of the operation of a search radar on board an aircraft for detecting a target within a search scan.
Figure 2:
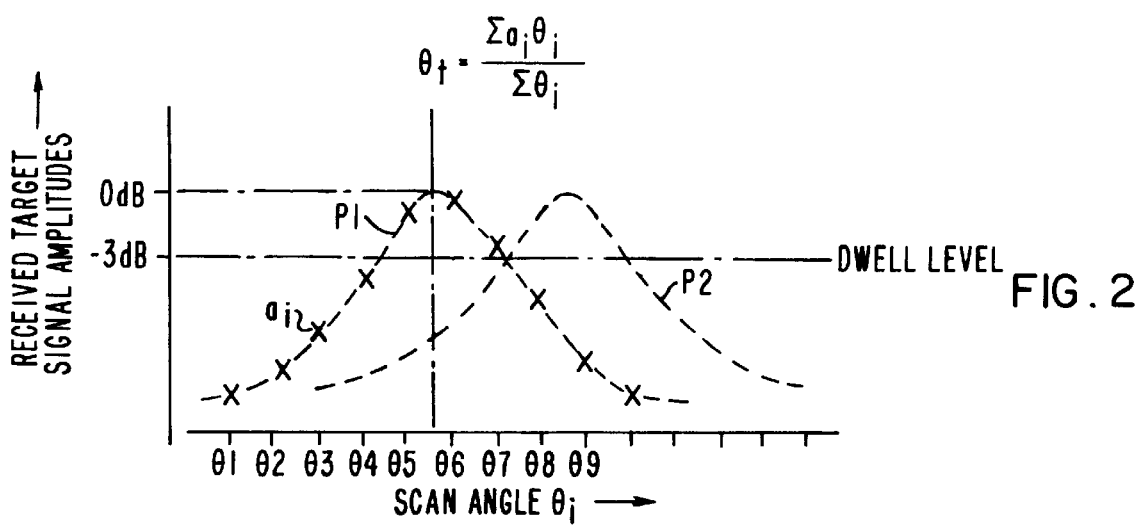
FIG. 2 is a graph idealistically exemplifying a simple centroid approach for estimating the scan angle of the detected target.
Figure 3:
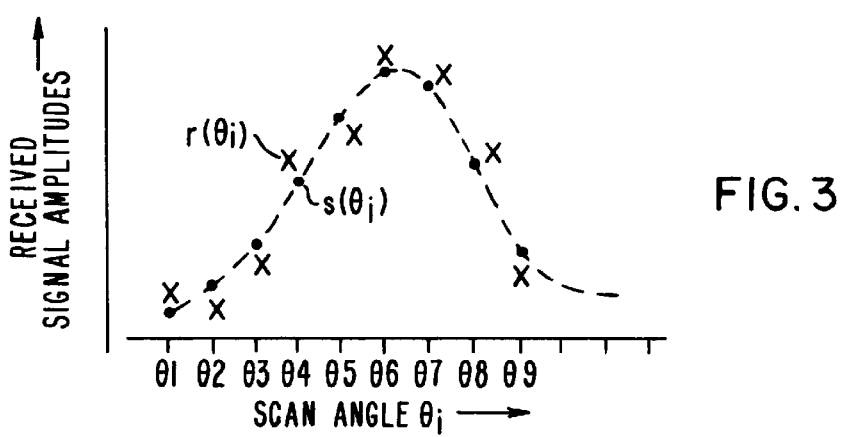
FIG. 3 is a graph which illustrates a case in which actual amplitude measurements from a target do not coincide with any one ideal curve fitting pattern as utilized by the simple centroid approach.
Figure 4:
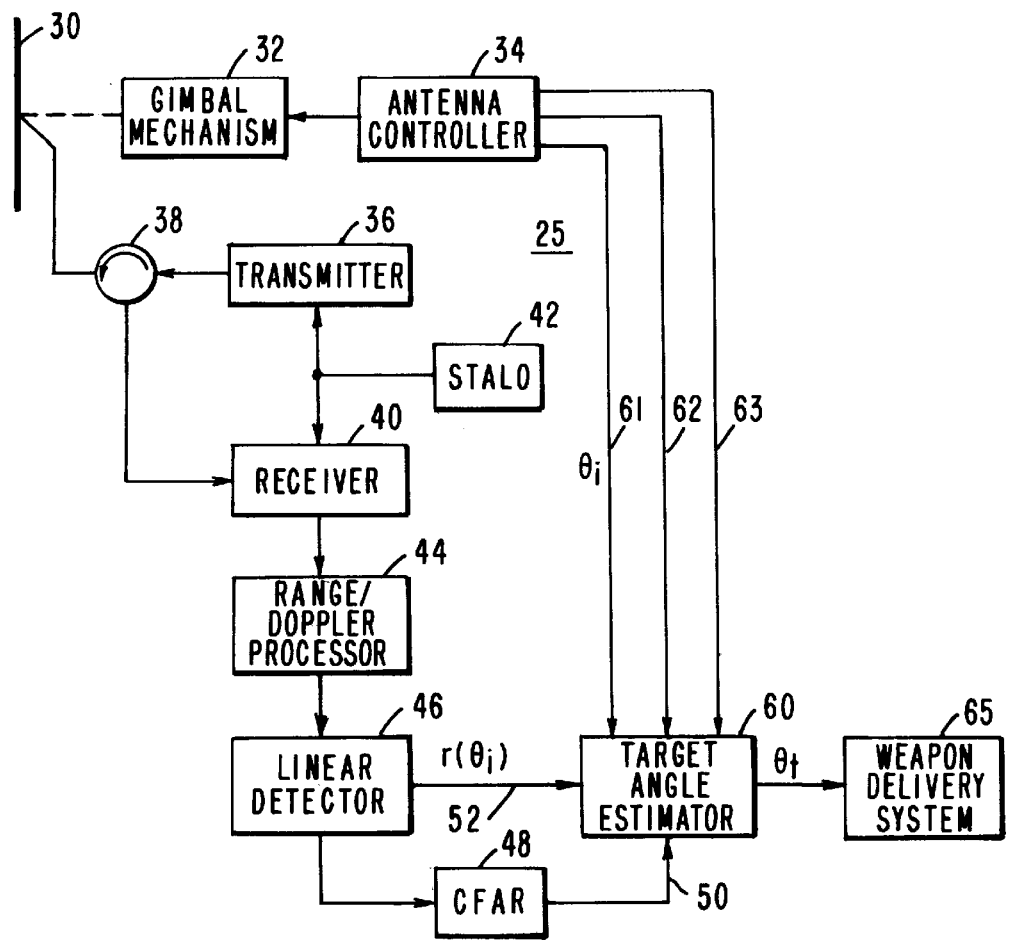
FIG. 4 is a functional block diagram schematic of a search radar suitable for embodying the principles of the present invention.

Referring to the block diagram schematic of FIG. 4, a conventional antenna shown at 30 may be operative either mechanically, electronically, or a combination of both, to conduct a radar beam through a search scan as exemplified by the description of the embodiment in connection with FIG. 1. For the present embodiment, the scan angle may be thought of as planar in the azimuth direction with respect to the aircraft. However, it is understood that an elevation direction or any planar combination therebetween may additionally be considered without deviating from the principles of the present invention.

In the embodiment of FIG. 4, the antenna 30 may be mechanically positioned through an azimuth scan search, for example, by a conventional gimbal mechanism 32 which in turn, may be governed by a conventional antenna controller 34. In addition, the search radar embodiment of FIG. 4 may also include the conventional radar elements of a transmitter 36, a duplexer 38, a receiver 40, a stable local oscillator 42, a range/doppler processor 44, a linear detector 46, and some type of a constant false alarm rate (CFAR) detector 48. In operation, the stable local oscillator 42 provides synchronizing clock signals to both the transmitter 36 and receiver 40 such that range and target echo doppler information can be associated correspondingly with the radar transmissions. Generally, the transmitter 36 provides bursts or pulses of radar energy through the duplexer 38 and antenna 30 into a spatial area in accordance with the angle direction set by the antenna 30. With respect to the beam pattern of the antenna system 30, received signals reflected from a target are conducted through the antenna 30, duplexer 38 to the receiver unit 40 wherein they are appropriately processed and passed along to the range/doppler processor 44. After the range and doppler information is extracted from the target reflected signals, the signals are conducted to the linear detector 46. Since these target reflected signals are complex in nature, the linear detector 46 computes the amplitudes thereof using conventional complex arithmetic techniques. The constant false alarm rate (CFAR) unit 48 generally functions cooperatively with the linear detector 46 to determine in a relative fashion if the target amplitude measurements derived by the detector 46 are greater than a relative threshold value such to be considered as being associated with a real target as opposed to merely instrumentation noise, for example. In turn, the CFAR 48, may provide a target detect signal over signal line 50 in accordance with its relative threshold comparison operations. In addition, the linear detector 46 may provide the actual target amplitude measurements $r(\theta_i)$ over signal line 52.

In accordance with the present invention, a target angle estimator unit 60 may be further disposed in the search radar 25 for deriving a true target estimation angle $\theta_t$ in accordance with the signals provided over signal lines 50 and 52 which are coupled thereto. In addition, the antenna controller 34 may be linked to the estimator unit 60 utilizing signal lines 61, 62 and 63, for example, in order to provide the information of: the present antenna scan angle; when the scan angle is being moved to a new scan angle; and, when the antenna has completed a search scan, respectively. The estimator 60 employs the information conducted over the signal lines 50, 52, 61, 62 and 63 to derive the estimated true target angle $\theta_t$ which it in turn may deliver to an on-board weapon delivery system 65 of the aircraft 10 for use thereby.

Theoretically, the target angle estimator 60 performs its computations under the assumption that the target amplitude measurements in the presence of noise may be approximated by the following Gaussian function:

$$S(\theta)=S_O\exp(-\alpha(\theta-\theta_t)^2) \quad (1)$$

where $\alpha$ may be equal, in the present embodiment, to 1.388 divided by the square of the antenna beam width B taken at approximately −3 dB. The principles of operation of the estimator 60 may be based on determining the best fit between the deterministic function, $s(\theta)$, and the actual target amplitude measurement, $r(\theta)$, derived at the antenna sampling scan angles or looks. In accordance with the optimization operations of the target angle estimator 60, the peak location of the best-fitted $s(\theta)$ is considered the optimal estimate of the true target angle in the search scan.

In developing the principles of the present invention mathematically, it was identified that the deterministic function, $s(\theta)$ is non-linear and therefore difficult to work with in regard to identifying the best-fitted curve for the actual target amplitude measurements $r(\theta)$ of a search scan. It was discovered that the fitting function may be reduced to a polynomial of $\theta$ in one case, for example, by performing a natural logarithmic transformation thereon. This logarithmic transformation produces the following equation:

$$lns(\theta)=lnS_O-\alpha(\theta-\theta_t)^2 \quad (2)$$

As is well known, there is always some concern in performing a transformation on a non-linear function especially with regard to the errors associated with large amplitudes. However, it is noted that the derivative of ln s(θ) with respect to s(θ) is the inverse of s(θ) as shown by the following equation:

$$\frac{d \ln s(\theta)}{ds(\theta)} = \frac{1}{s(\theta)} \quad (3)$$

Thus, the logarithmic transformation of the deterministic function provides the desired effect of suppressing the significance of errors at large amplitudes.

It is the purpose of this exemplary mathematical exercise to transform the deterministic function into a linear set of equations or curves to better identify the best-fitted curve and thus the target angle estimation. For this purpose, equation (2) may be expanded as shown below in equation (4) and thereafter reorganized as shown below in equation (5).

$$\ln s(\theta) = \ln s_O - \alpha \theta^2 + 2\alpha \theta \theta_t - \alpha \theta_t^2 \quad (4)$$

$$\ln s(\theta) + \alpha \theta^2 = \ln s_O - \alpha \theta_t^2 + 2\alpha \theta \theta_t \quad (5)$$

With the reorganization as shown in equation (5), it is readily apparent that those terms to the left of the equation sign are solely a function of θ and may be denoted mathematically as:

$$y(\theta) = \ln s(\theta) + \alpha \theta^2 \quad (6)$$

Moreover, if it is assumed that $s_O$, α, and $\theta_t$ are all fixed for each deterministic function or curve, then the first two terms to the right of the equation sign of the reorganization equation (5) may be represented as a constant, say $k_O$, for example, as shown by the following equation:

$$k_O = \ln s_O - \alpha \theta_t^2 \quad (7)$$

Similarly, the portion $2\alpha\theta_t$ of the remaining term in the reorganization equation (5) may also be represented as another constant, say $k_1$, for example, (i.e. $k_1 = 2\alpha\theta_t$). With these mathematical notations in mind then, the reorganization equation 4 may be rewritten in a linear form as shown below:

$$y(\theta) = k_O + k_1 \theta \quad (8)$$

Now if it is assumed that there are N+1 discrete scan angles in the search scan of the radar, then each scan angle may be denoted as $\theta_i$ with i=0, 1, . . . N. Using the same notation then, the target amplitude measurements with each discrete scan angle $\theta_i$ may be denoted as $r(\theta_i)$. Furthermore, if the corresponding values of scan angles and target amplitude measurements are substituted into the intermediate equation for y(θ), that is, $$y_i = \ln r(\theta_i) + \alpha \theta_i^2, \quad (9)$$

then a family of N+1 linear curves may be obtained for each i having only the constants $k_0$ and $k_1$ as shown below:

$$\begin{aligned} y_o &= k_o + k_1 \theta_o \\ y_1 &= k_o + k_1 \theta_1 \\ &\vdots \\ y_N &= k_o + k_1 \theta_N \end{aligned} \quad (10)$$

It was further identified that this set (10) of N+1 linear curves or equations may be placed in matrix form with the following notations:

$$\bar{Y} = \begin{bmatrix} y_o \\ y_1 \\ \vdots \\ y_N \end{bmatrix} \quad (11)$$

$$\bar{\theta} = \begin{bmatrix} 1 & \theta_o \\ 1 & \theta_1 \\ \vdots & \vdots \\ 1 & \theta_N \end{bmatrix} \quad (12)$$

$$\bar{k} = \begin{bmatrix} k_o \\ k_1 \end{bmatrix} \quad (13)$$

Using this matrix notation then, the set of linear equations may be rewritten as follows:

$$\bar{y} = \bar{\theta}\bar{k} \quad (14)$$

It was observed that the optimal value of the matrix $\bar{k}$ which yields the best fitted curve for the above matrix equation using the least squares method, for example, may be provided by the following equation:

$$\bar{k} = (\bar{\theta}^\tau \bar{\theta})^{-1} \bar{\theta}^\tau \bar{y} \quad (15)$$

For a better understanding of this mathematical optimization technique reference is made to the text "Applied Optimal Estimation" edited by Arthur Gelb and published by MIT Press (1974), and more particularly the section on Optimal Linear Filtering found therein.

Using well-known matrix mathematical techniques, the optimization equation (15) for the matrix $\bar{k}$ may be further reduced as follows:

$$\bar{k} = \begin{bmatrix} k_o \\ k_1 \end{bmatrix} = \frac{\begin{bmatrix} \sum \theta_i^2 & -\sum \theta_i \\ -\sum \theta_i & N+1 \end{bmatrix}}{(N+1)\sum \theta_i^2 - \left(\sum \theta_i\right)^2} \begin{bmatrix} \sum y_i \\ \sum \theta_i y_i \end{bmatrix} \quad (16)$$

In solving for $k^1$, it is found that:

$$k_1 = \frac{(N+1)\sum \theta_i y_i - \sum \theta_i \sum y_i}{(N+1)\sum \theta_i^2 - \left(\sum \theta_i\right)^2} \quad (17)$$

Since it is known that $k_1$ is proportional to the estimated target scan angle $\theta_t$ by the equation $k_1 = 2\alpha\theta_t$, then the optimal target scan angle $\theta_t$ may be expressed as:

$$\hat{\theta}t = \frac{k_1}{2\alpha} \quad (18)$$

Figure 5:
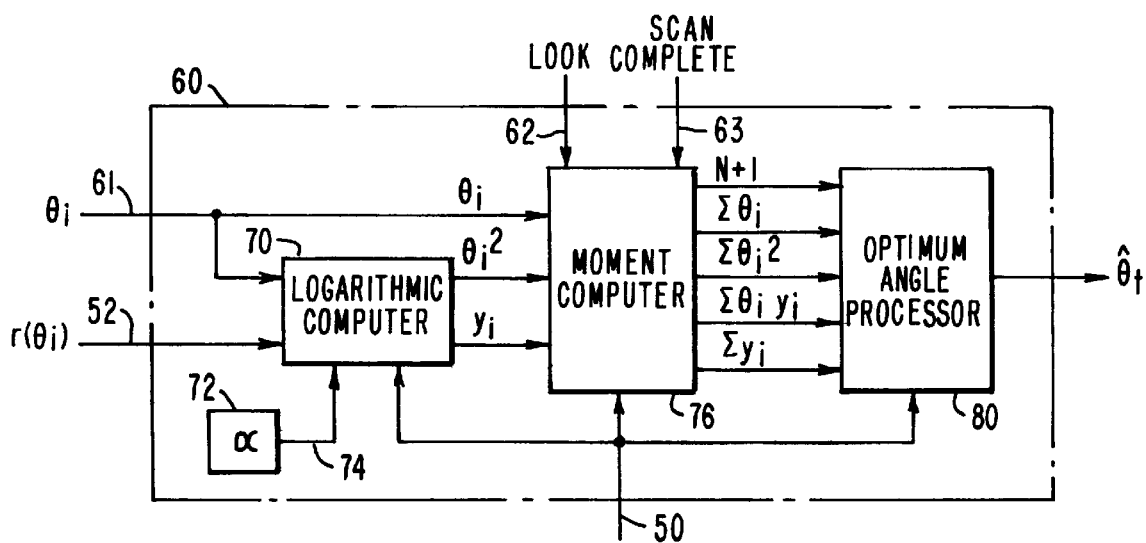
FIG. 5 is a block diagram schematic of a target angle estimator suitable for use in the embodiment depicted in FIG. 4.

The target angle estimator embodiment will now be described in greater detail using the schematic block diagram embodiments of FIGS. 5 and 6 while keeping the mathematical principles described hereabove in mind. Referring to FIG. 5, signals representative of the scan angle $\theta_i$ and target amplitude measurements $r(\theta_i)$ may be provided to a logarithmic computer 70 using signal lines 61 and 52, respectively. A conventional signal generator 72 may also be utilized, in the present embodiment, for providing a signal representative of the constant α to the logarithmic computer 70 over signal line 74. The primary function of the logarithmic computer 70 may be to compute the intermediate signal $y_i$ for each scan angle $\theta_i$ and associated target amplitude measurement $r(\theta_i)$ for a search scan of the radar. The computations may be performed in the computer 70 in accordance with a first function based on the generated angle signal $\theta_i$ and the generated target angle measurement signal $r(\theta_i)$ correspondingly associated therewith. As a by-product of the intermediate signal computation of 70, a signal $\theta_i^2$ may also be produced representative of the square of the scan angle signal $\theta_1$.

The representative signals $y_i, \theta_i^2$, and $\theta_i$ may be provided to a moment computer 76 which is operative to compute signals representative of moment relationships of the scan angle signals $\theta_i$ and intermediate signals $y_i$ for a search scan of the radar. To assist in the timing relationships for the moment computations of the computer 76 the timing signals denoted as LOOK and SCAN COMPLETE additionally be provided to the moment computer over signal lines 62 and 63, respectively. The resulting moment signals computed by the moment computer 76, denoted by the symbols $\Sigma\theta_i, \Sigma\theta_i^2$, $\Sigma\theta_i y_i$, and $\Sigma y_i$, for example, may be provided to an optimum angle processor 80 over their appropriately designated signal lines as shown in the schematic embodiment of FIG. 5. The moment computer 76 may be additionally operative to identify the number of discrete scan angles in the search scan of the radar, the number being denoted as N+1. A signal representative of this scan angle number is also provided to the processor 80 over an appropriately designated signal line. Accordingly, the optimum angle processor 80 is operative to compute a signal representative of the estimated target angle $\theta_t$ for a search scan in accordance with a second function based on the correspondingly associated moment related signals of the search scan computed by the moment computer 76 and provided thereto over the designated signal lines.

In the preferred embodiment, in order to improve the efficiency of operation of the target angle estimator 60, the various computation blocks 70, 76 and 80 of the target angle estimator 60 may be made operative only in response to the generated target detect signal over line 50. In this manner, the estimator 60 may not perform unnecessary computations when a target is not present in the search scan of the radar.

Figure 6:
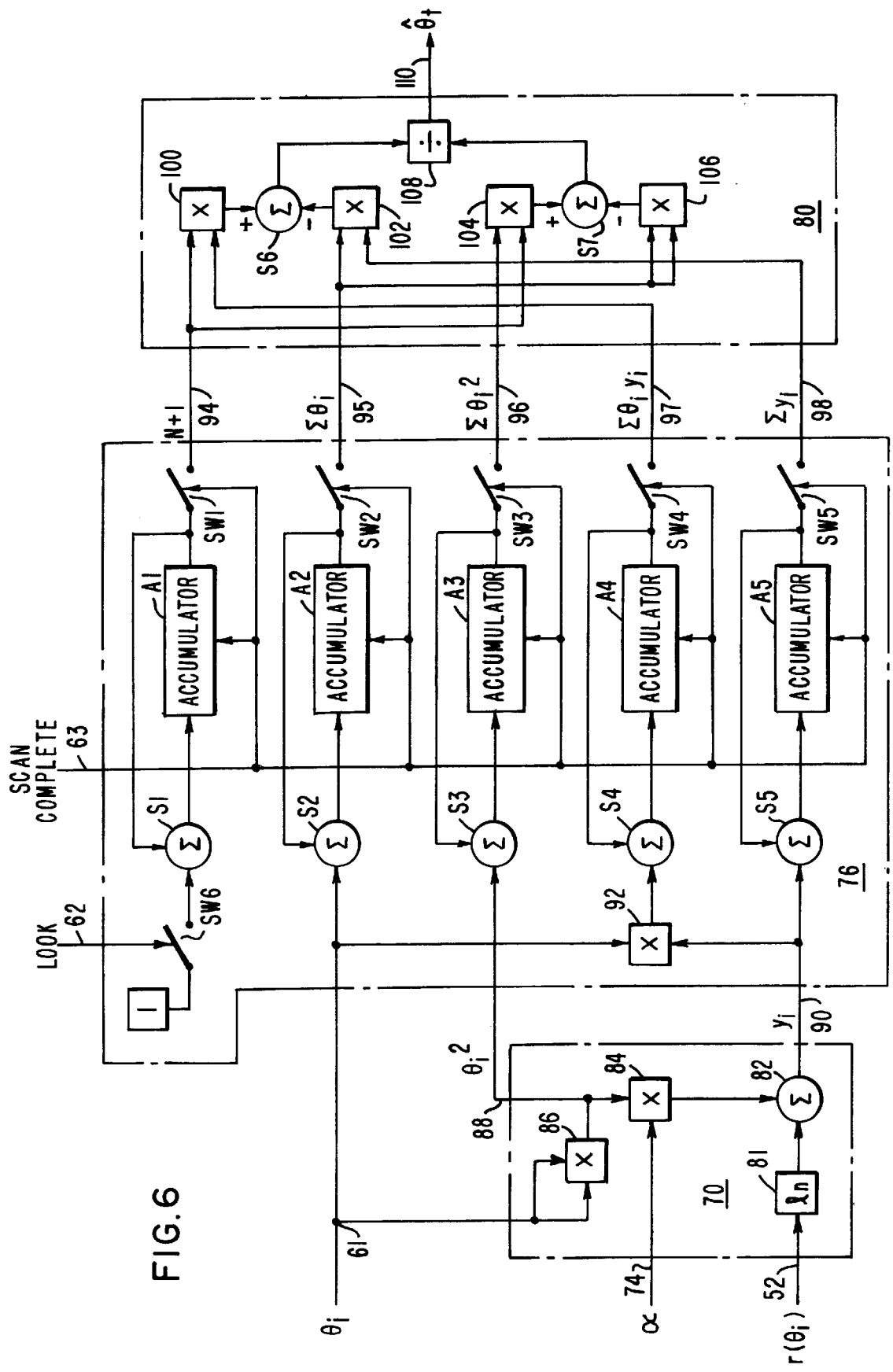
FIG. 6 is a schematic block diagram depictig the target angle estimator embodiment of FIG. 5 in greater detail.

The target angle estimator 60 is depicted in greater detail in the schematic block diagram embodiment of FIG. 6. Referring to FIG. 6, the target amplitude measure signal line 52 may be coupled to a conventional logarithmic functional block 81 disposed in the computer 70, the output of which being coupled to a conventional adder 82. The signal line 74 carrying the constant a representative signal may be coupled to one input of a conventional multiplier 84 and the output of the multiplier 84 may be coupled to the other input of the adder unit 82. Moreover, the signal line 61 carrying the scan angle signals $\theta_i$ may be coupled to both inputs of another multiplier unit 86, the output of which may be coupled to the other input of the first multiplier 84. The output of the multiplier 86 which carries the signal representative of $\theta_i^2$ and the output of the adder 82 which carries the signals representative of the intermediate signal $y_i$ may both be coupled to the moment computer 76 over signal lines 88 and 90, respectively. In addition, the signal line 61 may also be coupled to the moment computer 76.

Disposed within the moment computer 76 may be five conventional summer accumulator combinations denoted in FIG. 6 as S1–A1, S2–A2, S3–A3, S4–A4, and S5–A5. In each case, the output of the summer unit is coupled to the input of the accumulator and the output of the accumulator may be fed back to one input of the summer unit. In addition, the outputs of the accumulators A1–A5 may be coupled respectively to the inputs of a set of switches SW1–SW5. In the present embodiment, the scan complete signal provided over signal line 63 may be coupled to each accumulator and each switch for governing the timely operation thereof in connection with the search scan of the radar. Moreover, the signal lines 61 and 90 may be coupled to he inputs of the summer units S2 and S5 and in addition, ay be coupled to the inputs of another conventional multiplier unit 92. The signal line 88 may be coupled to the input of the summer unit S3 and the output of the multiplier unit 92 may be coupled to the input of the summer unit S4. Another switching device SW6 may be disposed in the moment computer 76 and may have a signal representative of a unit 1 coupled to its input and may be operated in the open and closed positions by the signal LOOK coupled thereto over signal line 62. The output of switch SW6 may be coupled to the input of the summer unit S1. Finally, the outputs of the switching units SW1–SW5 may be provided to the optimum angle processor 80 over the signal lines 94 through 98, respectively. The signal lines 95 through 98 carry the signals representative of the moment relationships of the scan angle signals $\theta_i$ and the intermediate signals $y_i$, and the signal line 94 carries the signal representative of the number of scan angles in the search scan (i.e. N+1).

Disposed in the processor 80 may be four additional conventional multiplier units 100, 102, 104 and 106. The signal lines 94 and 97 may be coupled to the inputs of unit 100, the signal lines 95 and 98 may be coupled to the inputs of unit 102, the signal lines 94 and 96 may be coupled to the inputs of unit 104 and the signal line 95 may be coupled to both inputs of the unit 106. The outputs of the multiplier units 100 and 102 may be coupled to the + and − inputs of another summer unit S6 disposed in the processor 80. Similarly, the outputs of the multiplier units 104 and 106 may be coupled to the + and − inputs of another summer unit S7 of the processor 80. The output signal lines of the summers S6 and S7 may be coupled to a conventional divider unit 108, the output line 110 of which providing the target angle estimation signal $\theta_t$.

In a typical operation, then, as the CFAR unit 48 identifies the presence of a target, the target detect signal may be provided to the target angle estimator block 60 over signal line 50 and activate the operation thereof. At the start of a search scan, the signal conducted over line 63 enables the accumulators A1 through A5 to begin their accumulation process. At each scan angle sample or look in the search scan of the radar, signals representative of the scan angle $\theta_i$ and the target amplitude measurement $r(\theta_i)$ are provided over signal lines 61 and 52, respectively, to the computer 70. From each of the corresponding sets of signals the logarithmic computer 70 computes the correspondingly associated signals representative of $\theta_i^2$ and $y_i$.

During a search scan, as each new representative signal of the group $\theta_i, \theta_i^2, \theta_i y_i$, and $y_i$ are generated, they are, in turn, accumulated in the corresponding accumulators A2 through A5 utilizing the summer units S2–S5, respectively associated therewith. In addition, with each new scan angle sample or look, switch SW6 is governed closed by the signal over signal line 62, for example, and the total number of looks in a search scan is accumulated in A1 utilizing the summer S1. At the end of a radar search scan, the contents of the accumulators A1 through A5 contain the moment and other representative signals desirable for computing the optimum target angle estimation $\theta_t$. At search scan completion, the switching units SW1 through SW5 may be governed to their closed position by the signal over signal line 63, for example, to provide the respective signals from the accumulators A1 through A5 to the processor 80.

In processor 80 the multipliers 100, 102, 104 and 106 multiply the signal pairs coupled to the inputs thereof and provide the resulting signal outputs to the appropriate summer units S6, or S7 wherein the predesignated subtraction operation are performed in each case. The signal representative of the difference operation of summer S6 is divided by the signal representative of the difference operation of summer S7 in the divider unit 108 to produce a signal representative of the target angle estimation over signal line 110. Accordingly, a similar set of operations may be performed in connection with each search scan of the radar and likewise an optimal target angle estimation signal $\overline{\theta}_t$ may be effected for each search scan.

A simulation of the principles of the present invention was performed to determine the improvements attainable with the use of the optimum target angle estimator in comparison with the simple centroiding method as discussed in the background section hereinabove. The simulation included a scintillating target with Rayleigh amplitude distribution which may be decorrelated between scan looks. In the examples below, 13 look measurements were used in the target angle calculations and the results were obtained with 1,000 trials having random alignment between the look scan angles and the true target angle. Exemplary results of the simulations are depicted in the graphs of FIGS. 7, 8 and 9.

Figure 7:
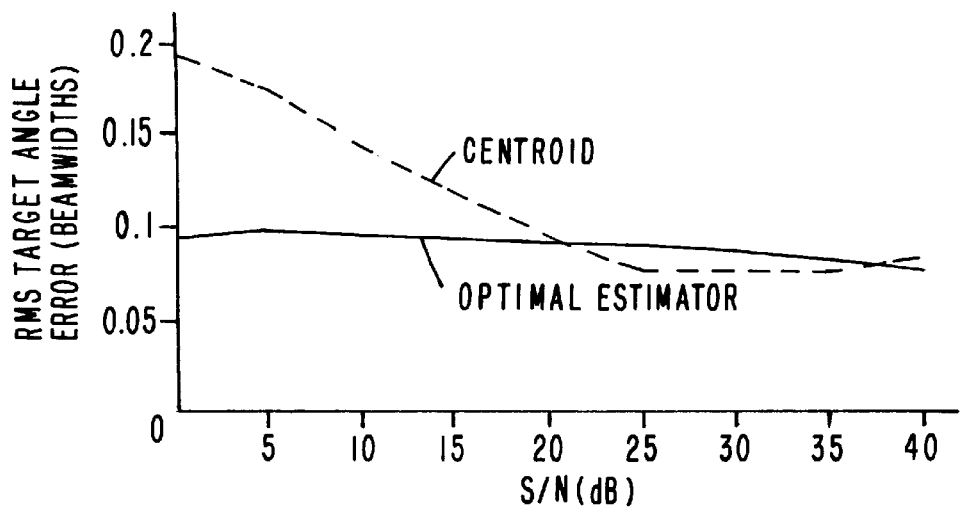
FIGS. 7, 8 and 9 are graphs exemplifying the improvements attainable with the use of the target angle estimator of FIGS. 5 and 6 in comparison with a simple centroid method.

In FIG. 7, which was conducted under the conditons of three looks per dwell, the RMS target angle error of the optimal estimator (solid line curve) is approximately half of that of the centroidal method (dashed line curve) at 0 dB signal-to-noise ratio (S/N), the improvement being gradually lower at higher S/N ratios. For example, for this example under 20 to 40 dB signal-to-noise ratio conditions, the optimal estimator, as simulated, suffered a slight degradation of 0 to 12%.

Figure 8:
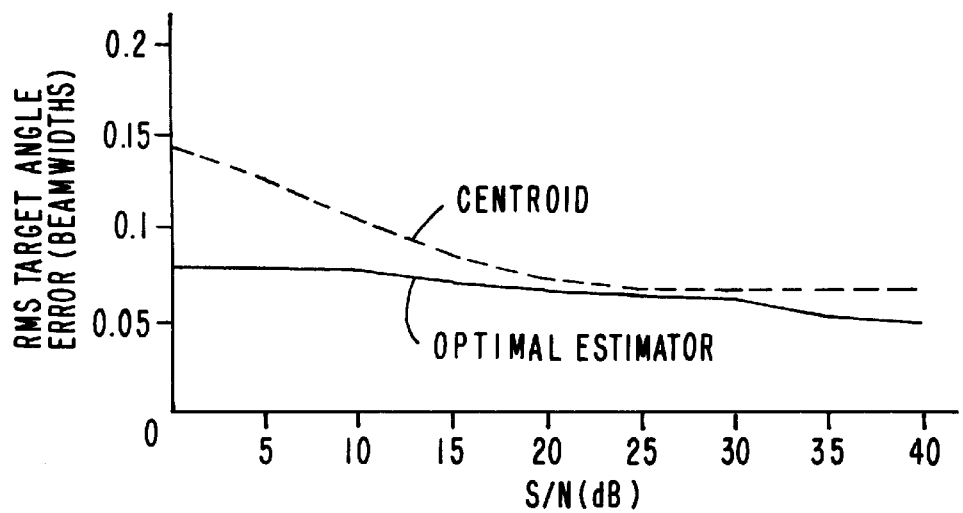
Figure 9:
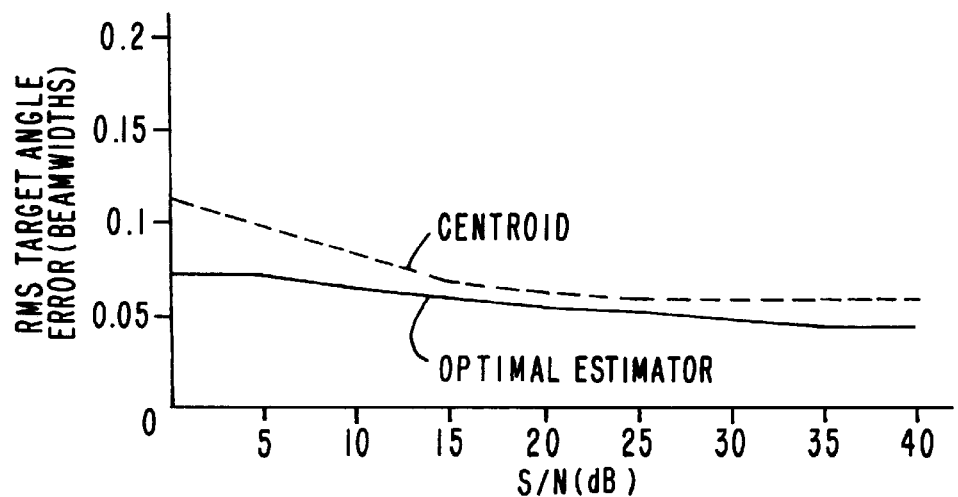

The simulation results of four and five looks per dwell cases as depicted in the graphs of FIGS. 8 and 9, respectively, show improvement over the entire 0 to 40 dB signal-to-noise ratio region. Under the four looks per dwell simulated conditons, the improvement decreases from 50% at 0 dB to 5% at 25 dB and then back up to 30% at 40 dB S/N ratio. Similar results are observed in the five looks per dwell example wherein the optimal estimator under simulated conditions provides improvement over the centroid method from 40% at 0 dB, down to 15% at 20 dB, and then, back up to 30% at 40 dB target signal-to-noise ratio.

With regard to the embodiments described in connection with FIGS. 4, 5 and 6, it is preferred that the target angle estimator be operative to perform calculations only with the information in those range-doppler cells which satisfy the detection criteria of the CFAR 48. Therefore, the number of operational calculations may be thus limited. Other advantages include: (1) the calculations involved in the embodied angle estimator 60 are mostly summations and multiplications involving only real numbers; and (2) the natural logarithmic function performed by block 80 in the logarithmic computer 70 may be implemented by a simple look-up table, for example. Moreover, since the present-day digital processing hardware capability is generally well-known by all those skilled in the pertinent art, the implementation of the various other elements as depicted in the block diagram schematic of FIG. 6, for example, may be implemented using straight forward engineering techniques.

It should also be pointed out that while the embodiment described in connection with FIG. 6 was used in the present application to describe the principles of the invention, it is understood that modifications may be made to this embodiment or other embodiments may be used to carry out the principles of Applicant's invention without deviating from those principles. Accordingly, Applicant's invention should not be limited to any one embodiment, but rather construed in connection with the broad scope and breadth of the claims heretofollow.

I claim:

1. In a search radar including means operative to transmit and receive radar signals for a plurality of predetermined scan angles within a search scan; means operative to generate a plurality of signals representative of said predetermined scan angles; and means operative to generate a plurality of target amplitude measurement signals derived from said received radar signals respectively corresponding to said plurality of predetermined scan angles, the improvement of apparatus for estimating the target angle within a search scan comprising:

first means operative to compute an intermediate signal for each prespecified angle of said plurality in accordance with a first function based on said generated angle signal and said generated target amplitude measurement signal correspondingly associated therewith;

second means operative to compute signals representative of moment relationships of said corresponding plurality of prespecified scan angle signals and intermediate signals for a search scan of said radar; and third means operative to compute a signal representative of said estimated target angle for a search scan in accordance with a second function based on the correspondingly associated moment related signals of said search scan computed by said second means.

2. The improvement in accordance with claim 1 wherein the search radar includes a means for detecting the presence of a target within the search scan of the radar from the derived amplitude measurement signals thereof and for generating a target detect signal as a result of said detected condition; and wherein said improvement apparatus includes means operative to compute the estimated target angles corresponding to the search scans for targets designated by said generated target detect signals.

3. The improvement in accordance with claim 1 wherein the first means includes:

means for computing first signals representative of the logarithm of the derived target amplitude measurement signals;

means for computing second signals proportionately representative of the square of the generated scan angle signals; and means for adding corresponding first and second signals to compute the intermediate signals associated therewith.

4. The improvement in accordance with claim 1 including means for computing first signals representative of the square of the generated scan angle signals and second signals representative of the product of correspondingly associated scan angle and intermediate signals; and wherein the second means includes means for accumulating separately said first signals, said second signals, the signals representative of the scan angles, and the intermediate signals over the period of a search scan.

5. The improvement in accordance with claim 4 wherein the second means includes means for operating the accumulating means to accumulate during a search scan, whereby the accumulated contents of the second means at the completion of a search scan are the signals representative of the moments of the first signals, second signals, scan angle representative signals and intermediate signals; and wherein the second means includes means for transferring said accumulated moment signals to the third means.

6. The improvement in accordance with claim 5 wherein the second means further includes means for generating a third signal representative of the number of angles which are scanned in each search scan of the radar.

7. The improvement in accordance with claim 6 wherein the third means includes:

means for generating first, second, third and fourth product signals representative of the products of: the third signal and moment signal of the second signals, the moment signal of the scan angle signals and the moment signal of the intermediate signals, the moment signal of the first signals and the third signal, and the moment signal of the scan angle signals with itself, respectively;

means for generating fourth and fifth signals by subtracting said second product signal from said first product signal and by subtracting said fourth product signal from said third product signal, respectively; and means for generating the signal representative of the estimated target angle for a search scan by dividing said fourth signal by said fifth signal.

* * * * *